(12) United States Patent
Portes et al.

(10) Patent No.: US 10,027,570 B2
(45) Date of Patent: Jul. 17, 2018

(54) COMMUNICATION NETWORK ON BOARD A VEHICLE AND A SWITCH OF SUCH A COMMUNICATION NETWORK

(71) Applicant: Airbus Operations (S.A.S.), Toulouse (FR)

(72) Inventors: Dominique Portes, Blagnac (FR); Sylvain Sauvant, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 310 days.

(21) Appl. No.: 15/077,016

(22) Filed: Mar. 22, 2016

(65) Prior Publication Data

US 2016/0285738 A1 Sep. 29, 2016

(30) Foreign Application Priority Data

Mar. 26, 2015 (FR) ...................................... 15 52567

(51) Int. Cl.
*H04W 4/04* (2009.01)
*H04L 12/751* (2013.01)
*H04L 29/08* (2006.01)
*H04L 12/40* (2006.01)
*H04L 12/417* (2006.01)
(Continued)

(52) U.S. Cl.
CPC ........ *H04L 45/02* (2013.01); *H04L 12/40176* (2013.01); *H04L 12/417* (2013.01); *H04L 49/351* (2013.01); *H04L 67/12* (2013.01); *H04L 49/70* (2013.01); *H04W 84/18* (2013.01)

(58) Field of Classification Search
CPC ... H04L 45/02; H04L 63/0428; H04L 12/417; H04L 49/351; H04L 67/12; H04L 49/70; H04W 4/046; H04W 84/18
See application file for complete search history.

(56) References Cited

U.S. PATENT DOCUMENTS 8,738,020 B2 * 5/2014 Li .......................... H04L 1/0003
370/203
9,813,387 B2 * 11/2017 Loch ................... H04L 63/0428
(Continued)

FOREIGN PATENT DOCUMENTS

EP 1282273 A1 * 2/2003 ......... B60R 16/0315

OTHER PUBLICATIONS

French Search Report cited in FR 1552567, completed Jul. 17, 2015, six pages.

*Primary Examiner* — Afsar M Qureshi
(74) *Attorney, Agent, or Firm* — Nixon & Vanderhye P.C.

(57) ABSTRACT

A communication network on board a vehicle is a deterministic switched Ethernet network using virtual links, which includes a set of links, a set of subscribers and at least one switch containing a static configuration table that can be configured according to virtual links passing through this switch. This switch is integrated in a subscriber from the set of subscribers and is connected to the subscriber so as to enable communications between the subscriber and at least one other subscriber of the communication network. The switch includes at least three external communication ports (PE1, PE2, PE3) and the communication network is configured according to a mesh topology such that this switch is connected to at least three other entities corresponding to subscribers and/or switches of the communication network.

20 Claims, 5 Drawing Sheets

(51) Int. Cl.
*H04W 84/18* (2009.01)
*H04L 12/931* (2013.01)

(56) References Cited

U.S. PATENT DOCUMENTS

| | | | | |
|---|---|---|---|---|
| 2005/0229040 A1* | 10/2005 | Franke | ............... | H04L 41/00 |
| | | | | 714/25 |
| 2012/0290692 A1* | 11/2012 | Reich | ............... | H04L 12/437 |
| | | | | 709/220 |
| 2013/0151032 A1* | 6/2013 | Kraeling | ............... | H04L 45/74 |
| | | | | 701/1 |
| 2015/0372948 A1* | 12/2015 | Fanara | ............... | H04L 49/351 |
| | | | | 370/338 |

* cited by examiner

COMMUNICATION NETWORK ON BOARD A VEHICLE AND A SWITCH OF SUCH A COMMUNICATION NETWORK

RELATED APPLICATION

The present application claims priority to French Patent Application Number 15 52567, filed Mar. 26, 2015, the disclosure of which is entirely incorporated by reference.

TECHNICAL FIELD

The technology herein relates to the field of communication networks, and more particularly to communication networks on board aircraft.

BACKGROUND

Generally, aircraft contain one or more onboard communication networks provided to enable communications between onboard equipment, such as onboard computers. In order to meet the regulatory requirements regarding certification of aircraft, an onboard communication network must be deterministic, i.e. it must provide for a transmission of information from an item of transmitting equipment subscribed to this communication network to one or more items of receiving equipment subscribed to this communication network, with a transmission duration of less than a predetermined duration and a guarantee of no loss of information through the network. The standard ARINC 664 part 7 defines a deterministic onboard avionics communication network, based on a full-duplex Ethernet technology. Such a network can for example be an AFDX® communication network. In a network compliant with the standard ARINC 664 part 7, each item of equipment is connected to a switch of the network and communications between the various items of equipment follow virtual links that are predefined during the definition and configuration of the network. A virtual link is defined between an item of transmitting equipment and one or more items of receiving equipment, via one or more switches of the network. Each virtual link follows a determined path in the network. A bandwidth is allocated to each virtual link and the various virtual links of the network are routed such that the sum of the bandwidths allocated to the virtual links that follow a same physical link does not exceed the bandwidth supported by said physical link. This is necessary to ensure the determinism of the network. All communications between equipment are defined in advance, by the definition of virtual links, in order to enable switches to be configured: each switch contains a configuration table according to the virtual links passing through this switch. The configuration of each switch is uploaded into the latter before it is used. A switch generally includes a significant number of communication ports, for example 24 ports for some switches. However, the higher the number of communication ports of the switch, the higher the number of virtual links capable of passing through this switch and the more complex and larger the configuration table. Given the complexity of such a switch, in order to meet the requirements, in particular regarding latency time, the switch is generally implemented by means of a specific electronic circuit. A modern aircraft can contain a large number of such switches, for example 14 switches on some aircraft. It would be beneficial to reduce the mass, size and electrical consumption of each switch in order to improve the aircraft performance.

SUMMARY OF THE INVENTION

The technology herein seeks to provide a solution to these above-identified problems. It concerns a communication network on board a vehicle, the communication network being a deterministic switched Ethernet network using virtual links and including:
a set of links;
a set of subscribers; and
at least one switch containing a static configuration table that can be configured according to virtual links passing through this switch.

This network is notable in that:
said at least one switch is integrated in a subscriber from the set of subscribers and is connected to said subscriber so as to enable communications between said subscriber and at least one other subscriber of the communication network, and
this switch integrated in said subscriber includes at least two external communication ports, and the communication network is configured according to a topology such that this switch integrated in said subscriber is connected to at least two other entities by links from the set of links, these entities corresponding to subscribers and/or switches of the communication network.

Thus, since said at least one switch is integrated in a subscriber of the communication network, this switch does not form the subject of a specific item of equipment, thereby providing for reducing its mass and its size. Furthermore, it is powered by the electrical supply of the subscriber, thereby also providing for reducing the electrical consumption. On the other hand, given that the switch is integrated in the subscriber, it is not necessary to wire a communication link in the vehicle between the subscriber and an external switch, thereby further providing a saving in mass and size.

According to particular embodiments that can be taken in isolation or in combination:
the subscribers from the set of subscribers and said at least one switch are configured to communicate over the communication network according to a communication protocol compatible with the standard ARINC 664 part 7;
the switch integrated in said subscriber includes at least three external communication ports, and the communication network is configured according to a mesh topology, such that this switch integrated in said subscriber is connected to at least three other entities by links from the set of links;
the communication network includes at least four switches each integrated in a subscriber from the set of subscribers, each of said at least four switches being connected to at least four other entities by links from the set of links, the topology of the communication network being of matrix type;
each switch of the communication network is integrated in a subscriber from the set of subscribers;
said at least one switch of the communication network integrated in said subscriber is implemented in software form in said subscriber;
the network switch and at least one application of the subscriber are implemented in software form in the same electronic component of the subscriber;
the communication network includes redundant virtual links, these redundant virtual links following different paths in the communication network;
a second switch is integrated in said subscriber and connected to said subscriber, this second switch being connected to a second communication network that is different from and redundant to said communication network.

The technology herein relates also to a subscriber of a communication network on board a vehicle, the communication network being a deterministic switched Ethernet network using virtual links and including:
- a set of links;
- a set of subscribers, including said subscriber; and
- at least one switch containing a static configuration table that can be configured according to virtual links passing through this switch.

The subscriber is notable in that:
said switch is integrated in the subscriber and is connected to said subscriber so as to enable communications between said subscriber and at least one other subscriber of the communication network,
the switch integrated in said subscriber includes at least two external communication ports such that this switch can be connected to at least two other entities of the communication network by links from the set of links, these entities corresponding to subscribers and/or switches of the communication network.

Advantageously, the switch of the communication network integrated in said subscriber is implemented in software form in said subscriber. Advantageously again, this switch of the communication network and at least one application of the subscriber are implemented in software form in the same electronic component of the subscriber.

In one embodiment, a second switch is integrated in said subscriber and connected to said subscriber, so as to provide a redundancy of the communication network when this second switch is connected to a second communication network that is different from and redundant to said communication network.

The technology herein relates also to an aircraft including a communication network as mentioned above.

BRIEF DESCRIPTION OF THE DRAWINGS

These and further aspects of the exemplary implementations will be better understood upon reading the following description and upon examining the appended drawings.

DETAILED DESCRIPTION

Figure 2:
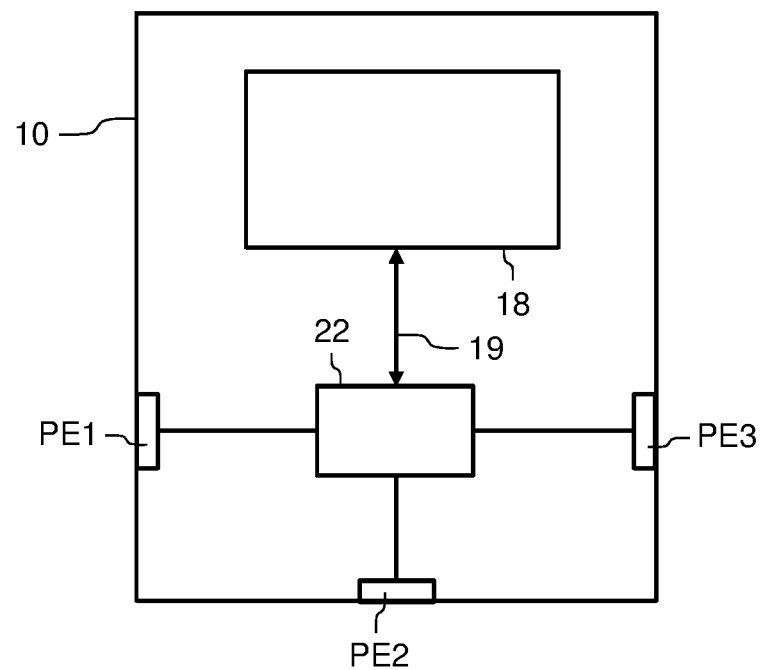
FIG. 2 schematically represents the functional architecture of a subscriber of a communication network, in accordance with one example embodiment of the invention.

The subscriber 10 of a communication network represented in FIG. 2 implements at least one application 18 corresponding to a function of a vehicle on board, in which there is a communication network. This function can, for example, relate to the navigation or guidance of the vehicle, the management of alerts or the management of an engine of the vehicle, in particular when the vehicle is an aircraft. The subscriber 10 also includes a communication network switch 22, integrated in said subscriber. The switch is connected to the application 18 by a link 19 so as to enable communications between the application 18 of said subscriber and at least one other subscriber of the communication network. From a functional perspective, this is equivalent to a link between the subscriber 10, in particular its at least one application 18, and the switch 22 via a communication port of the switch, this communication port being internal to the subscriber 10, even if from a hardware perspective, the switch 22 does not necessarily include a physical communication port for this link. The subscriber 10 also includes at least three external communication ports PE1, PE2, PE3 connected to the switch 22. These three communication ports provide for connecting the switch 22 to other subscribers and/or to other switches of the communication network. Having at least three external communication ports means that the subscriber 10 can be used in a communication network having a mesh topology. A static configuration table, according to virtual links passing through the switch 22, is associated with this switch. Having a switch with a reduced number of ports as compared with the number of ports of conventional switches (for example equal to 24 ports) means that the performance levels and resources required to implement the switch can be reduced, such as the size of the configuration tables, the size of the buffers associated with the communication ports, etc.

Figure 3:
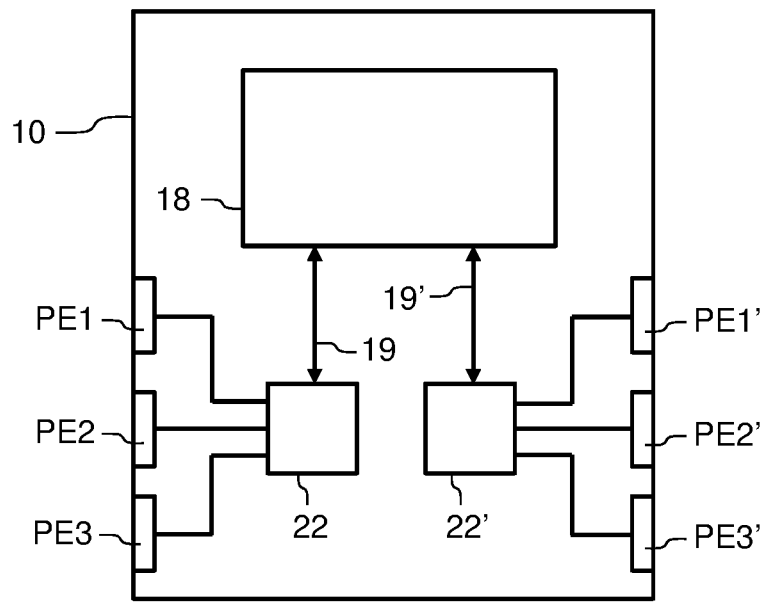
FIG. 3 schematically represents the functional architecture of a subscriber of a communication network, in accordance with a particular example embodiment of the invention.

In one advantageous embodiment represented in FIG. 3, the subscriber 10 additionally includes a second switch 22' connected to said at least one application 18 by a link 19'. The subscriber 10 also includes three other external communication ports PE1', PE2', PE3'. These three other communication ports can be connected to a second communication network that is different from the communication network in question, so as to provide redundancy thereto. A second static configuration table, according to virtual links passing through the switch 22', is associated with this switch 22'.

From a hardware perspective, according to a first alternative, not represented, the switch 22 is implemented by means of a specific electronic circuit. This specific electronic circuit and an electronic circuit implementing said at least one application 18 are integrated together in the same package, even on the same printed circuit. In one embodiment, the specific circuit implementing the switch 22 includes a communication port which is connected to a communication port of the electronic circuit implementing the application 18.

Figure 4:
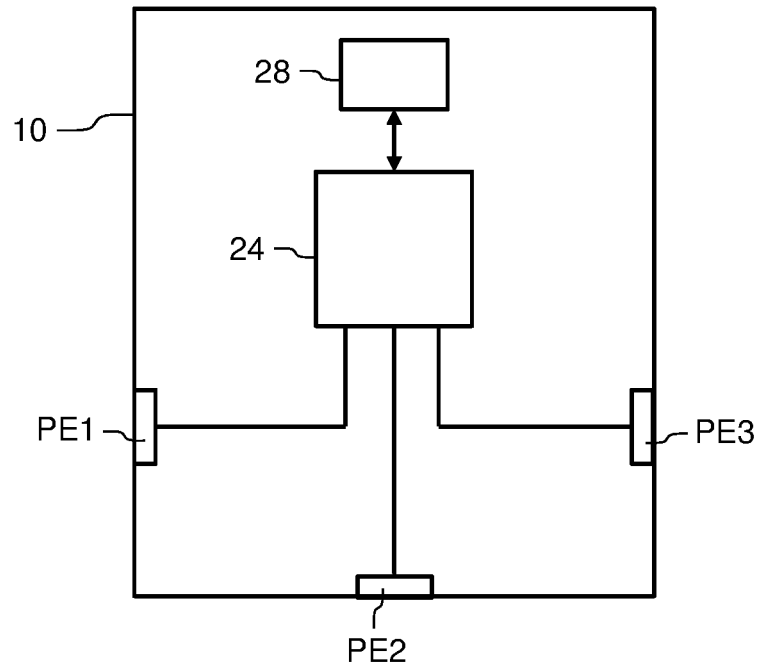
FIG. 4 schematically represents the hardware architecture of a subscriber of a communication network, in accordance with an example embodiment of the invention, the functional architecture of the subscriber is represented in FIG. 2.

According to a second alternative represented in FIG. 4, said at least one application 18 and the switch 22 are implemented by the same electronic circuit 24. This electronic circuit can notably correspond to a processor or to a microprocessor, connected to a memory 28. This memory can be separate from the processor or be integrated therein. This processor or this microprocessor can just as well be produced according to a single-core technology as it can according to a multicore and/or manycore technology. In the case of a multicore/manycore processor, the application 18 and the switch 22 can be implemented either in the same processor core, or one in one core and the other in another core of the processor. Information can be exchanged between the application 18 and the switch 22 by means of a shared memory area in the memory 28. This avoids implementing a specific physical link. This exchange of information can also be implemented directly inside the processor, thereby also avoiding implementing a specific physical link. The configuration table associated with the switch 22 can for example be stored in the memory 28. The hardware architecture corresponding to this second alternative is particularly advantageous, since it provides for using, for the switch, hardware resources that already exist in the subscriber 10: electrical power supply, processor, etc. Furthermore, since a conventional communication link is not used for the communication between the application 18 and the switch 22, this communication is not limited in speed by the maximum communication speed of such a link.

Figure 5:
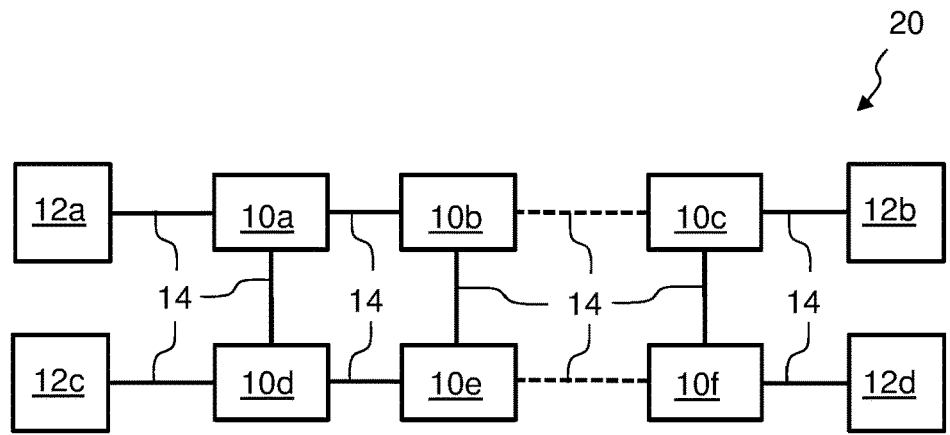
FIGS. 5, 6, 7 and 8 represent various exemplary non-limiting embodiments of a communication network in accordance with the invention.

The communication network 20 represented in FIG. 5 corresponds to a communication network on board a vehicle. This network includes a set of subscribers, including a first subset of subscribers 12a, 12b, 12c, 12d and a second subset of subscribers 10a, 10b, . . . 10f. A switch is integrated in each of the subscribers from the second subset of subscribers. The subscribers from the second subset of subscribers are similar to the subscriber 10 already described. The subscribers from the first subset of subscribers are, for their part, ordinary subscribers not containing switches. The communication network 20 additionally includes a set of communication links 14. In the example represented in FIG. 5, each subscriber from the second subset of subscribers is connected, by links 14 of the set of communication links 14, either to three subscribers from the second subset of subscribers, such as the subscribers 10b and 10e, or to two subscribers from the second subset of subscribers and to one subscriber from the first subset of subscribers, such as the subscribers 10a, 10c, 10d and 10f. This provides for obtaining a mesh topology of the communication network 20, enabling any subscriber of the communication network to communicate with any other subscriber. "Mesh topology" is understood to mean that subscribers from the second subset of subscribers, each including a switch, are connected to each other by means of links 14, forming closed loops. Thus, for example, a first closed loop corresponds to the subscribers 10a, 10b, 10e and 10d. A second closed loop corresponds to the subscribers 10b, 10c, 10f and 10e. In particular, the communication network includes at least two neighboring closed loops, i.e. closed loops having at least one common link, such as the link between the subscribers 10b and 10e in the abovementioned example.

Figure 1:
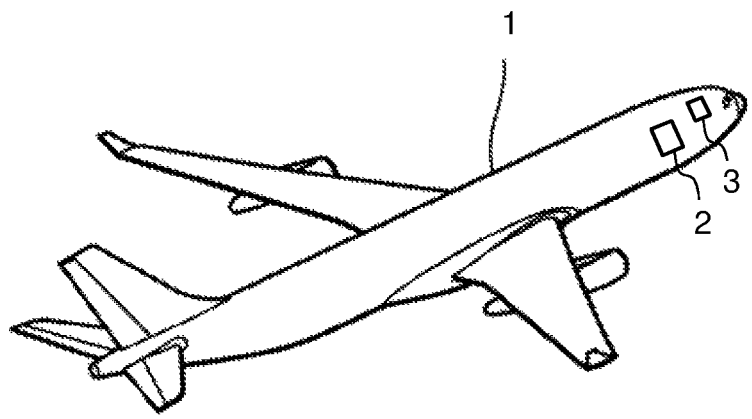
FIG. 1 illustrates in a simplified manner an aircraft including a communication network.

In one embodiment, the vehicle on board in which the communication network is fitted is an aircraft 1 including a cockpit 3 as represented in FIG. 1. The subscribers from the set of subscribers correspond notably to computers of the aircraft, for example avionics computers. These computers, as well as the communication links, can be located, entirely or in part, in an avionics rack 2 of the aircraft.

In an example embodiment, the subscribers and the switches are configured to communicate over the communication network according to a communication protocol compatible with the standard ARINC 664 part 7.

Figure 6:
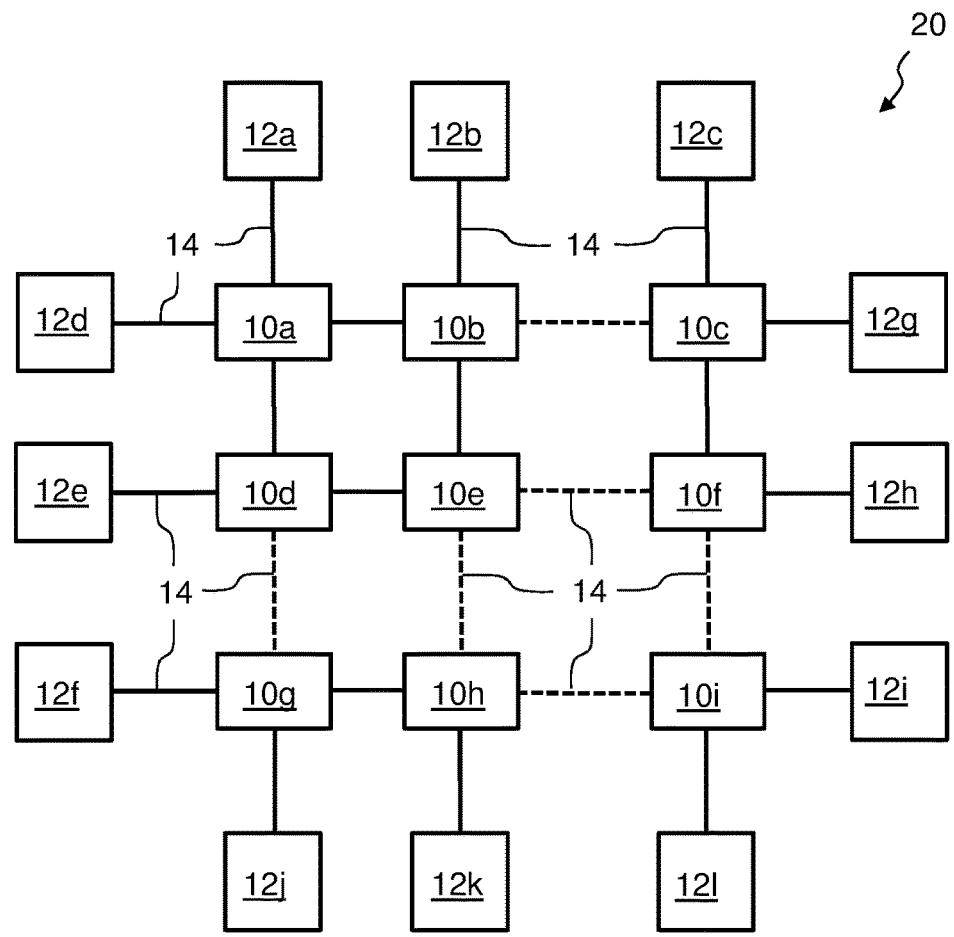

In another example embodiment represented in FIG. 6, the subscribers 10a, 10b, . . . 10i from the second subset of subscribers each include four external communication ports. By virtue of these four external communication ports, each subscriber from the second subset of subscribers is connected, by links 14 of the set of communication links 14, either to four subscribers from the second subset of subscribers, such as the subscriber 10e, to three subscribers from the second subset of subscribers and one subscriber from the first subset of subscribers 12a, 12b, . . . 12l, such as the subscribers 10b, 10d, 10f and 10h, or to two subscribers from the second subset of subscribers and two subscribers from the first subset of subscribers, such as the subscribers 10a, 10c, 10g and 10i. This provides for obtaining a mesh topology of the communication network 20, this mesh topology moreover is of a two-dimensional matrix type. "Two-dimensional matrix topology" is understood to mean that the links between the various subscribers define rows and columns: a first row corresponds to the subscribers 12d, 10a, 10b, 10c, 12g successively connected to each other, a second row corresponds to the subscribers 12e, 10d, 10e, 10f, 12h and a third row corresponds to the subscribers 12f, 10g, 10h, 10i, 12i. A first column corresponds to the subscribers 12a, 10a, 10d, 10g, 12j successively connected to each other, a second column corresponds to the subscribers 12b, 10b, 10e, 10h, 12k and a third column corresponds to the subscribers 12c, 10c, 10f, 10i, 12l.

Figure 7:
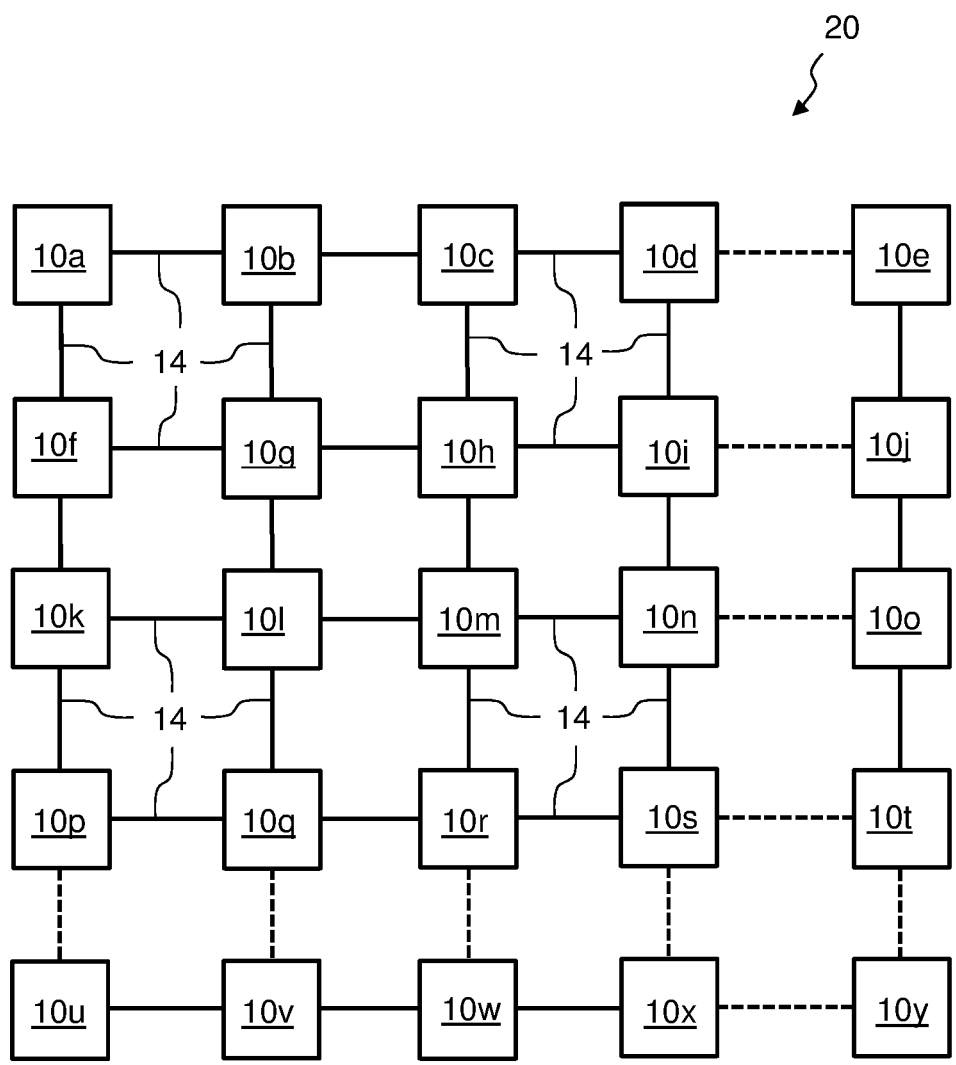

In one variant illustrated in FIG. 7, all the subscribers 10a, 10b, . . . 10y of the communication network 20 include an integrated switch. It is thus possible to put into place more links between the subscribers of the communication network: thus, for example, the subscriber 10k is connected to the subscribers 10f and 10p, in addition to being connected to the subscriber 10l, while in the example represented in FIG. 6, the subscriber 12e is connected only to the subscriber 10d. This provides for greater redundancy of the communication links, and a better distribution of virtual links between the various links. For the same purpose, it is also possible to provide links, not represented in the figure, for connecting subscribers located at two ends of a row or a column to each other. For the rows, these links can be provided between the subscribers 10e and 10a, 10j and 10f, etc. For the columns, these links can be provided between the subscribers 10u and 10a, 10v and 10b, etc.

Advantageously, redundancy of virtual links in the communication network is provided, redundant virtual links following different paths in the communication network. Thus, when a first virtual link, defined between a transmitting subscriber and at least one receiving subscriber, passes through another subscriber of the communication network, if this other subscriber of the network (or at least the switch integrated in this other subscriber) is in a failure condition, the first virtual link is no longer operational. By having at least one other virtual link, redundant with respect to the first virtual link, continuity of communications between the transmitting subscriber and the at least one receiving subscriber can be ensured. In operation, the transmitting subscriber sends identical data frames over the various redundant virtual links and a receiving subscriber takes into account for example only the first frame received. The number of redundant virtual links between them is not necessarily limited to two: it can also be equal to three, or more, thereby providing for improving the availability of the communication network in the event of failures. The provision of redundancy of virtual links in the same communication network exhibits the advantage of improving the availability of the communication network without requiring additional hardware resources.

Figure 8:
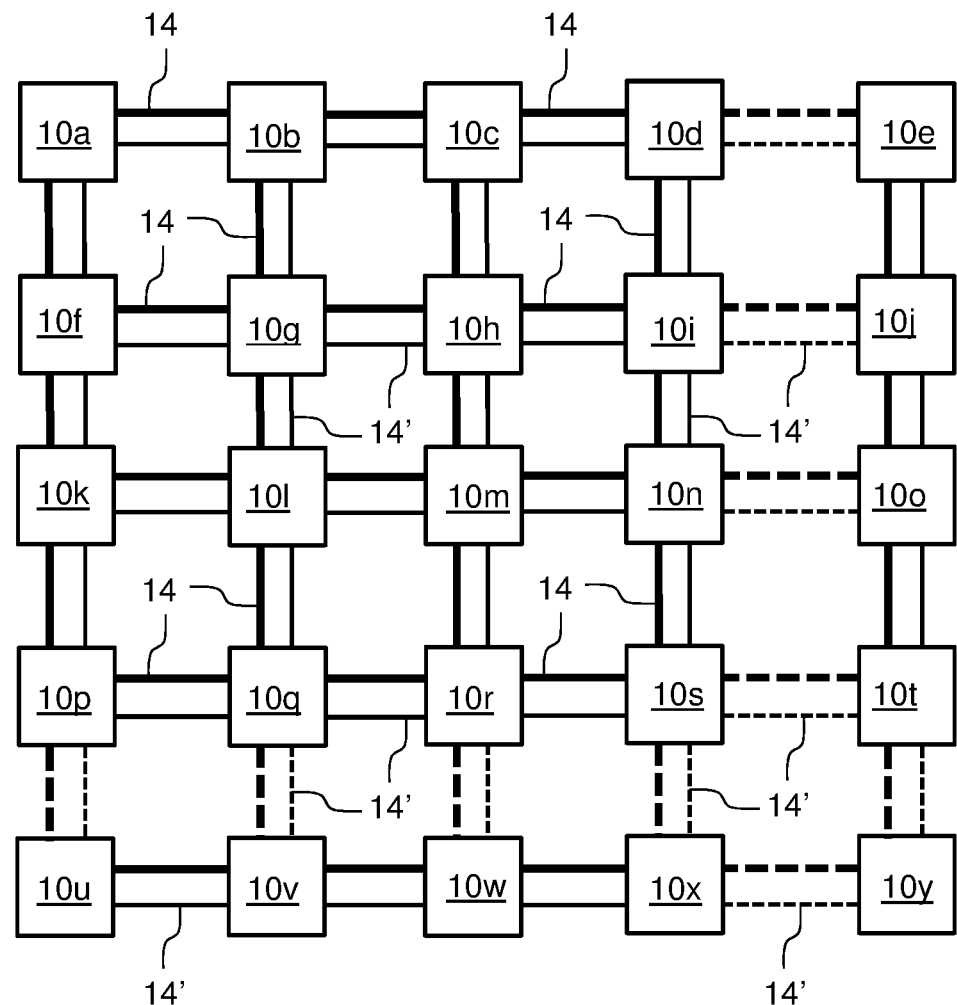

The example embodiment represented in FIG. 8 is similar to that represented in FIG. 7, except that the various subscribers each includes two switches. These subscribers are for example similar to the subscriber 10 already described, illustrated in FIG. 3, except that each switch is connected to four external communication ports. The first switch of each subscriber is connected to other first switches of other subscribers, by means of links 14 (represented by bold lines) of a first communication network, as in the example embodiment represented in FIG. 7. Moreover, the second switch of each subscriber is connected to other second switches of other subscribers, by means of links 14' (represented by thin lines) of a second communication network that is independent of the first communication network. This provides for incorporating redundancy of communications between the subscribers. Thus, when a first virtual link is defined in the first communication network between a transmitting subscriber and one or more receiving subscribers, a second virtual link is defined in the second communication network between the transmitting subscriber and the receiving subscribers. This second virtual link can follow a path similar to the path followed by the first virtual link, i.e. when the first virtual link passes through first switches of a series of subscribers, the second virtual link passes through the second switches of the same subscribers. However, advantageously, the second virtual link can also follow a path different from the path followed by the first virtual link. The second virtual links are hence dissimilar, thereby providing for overcoming common failure modes, for example a failure of an electrical supply of a subscriber through which a virtual link passes. In operation, the transmitting subscriber sends identical data frames over the first virtual link and over the second virtual link, only the first of these two received frames being taken into account by a receiving subscriber.

In a particular example embodiment, the switch 22 integrated in the subscriber 10 implements a function for regulating the flow of the outgoing traffic ("traffic shaping") on its external communication ports. The implementation of said function provides for notable optimizations of the communication network, such as the possibility to connect low-cost subscribers that cannot support a succession of consecutive frames. It also enables simplification of the demonstration of the determinism of the network, by means of a switch by switch analysis instead of a full analysis of the communication network based on its topology and on the definition of the set of virtual links. Indeed, by virtue of the implementation of this function, it is possible to characterize a maximum latency time corresponding to a virtual link passing through the switch. When a virtual link passes through several switches, the latency time between the transmission of a data frame over this virtual link by a transmitting subscriber and its reception by a receiving subscriber is equal to the sum of the latency times due to the various switches passed through by this virtual link. The calculation of the latency times corresponding to the various virtual links of the communication network thus provides for facilitating the demonstration of the determinism of the communication network by avoiding a full simulation of the communication network from being carried out.

In deterministic networks, in particular those compliant with the standard ARINC 664 part 7, the switches generally implement a function for controlling the incoming traffic received on the various communication ports. This function (referred to as "traffic policing") notably provides for rejecting data frames which would be received in excess with respect to the bandwidth allocated to the corresponding virtual link. According to a particular example embodiment of the invention, the switch 22 integrated in the subscriber 10 can be configured without this incoming traffic control function, thereby providing for simplifying the implementation of said switch. This can notably be beneficial when the data frames received over a virtual link come from a transmitter exhibiting a low risk of disturbing the communication network, for example a subscriber corresponding to a sensor and capable of transmitting a limited volume of data.

In an advantageous example embodiment, the communication network additionally provides for transmitting data frames not benefiting from the determinism of the network: these data frames are routed with a guarantee of service that is lower than the data frames routed over the virtual links. The document FR2.905.047 describes an example switch allowing the coexistence of deterministic flows and non-deterministic flows in a communication network of an aircraft. The principle of such a switch can be implemented in the switch 22 of the abovementioned subscriber 10.

The example embodiments described previously are not limiting for the invention. For example, in the matrix topology, certain rows or certain columns can be incomplete, i.e. they can include fewer subscribers than other rows or other columns. Furthermore, a set of subscribers each including two external communication ports can be connected to a subscriber connected to the communication network according to a matrix topology. For example, this set of subscribers can correspond to intelligent sensors connected in series by means of said two communication ports, and thus forming a sensor chain. This sensor chain can for example be connected to a subscriber located at the end of a row or column in the abovementioned topology matrix examples.

Moreover, the various examples correspond to a two-dimensional matrix topology. It would also be possible to use a three-dimensional matrix topology, or even one with more dimensions, so as to reduce the number of switches that a virtual link passes through between a transmitting subscriber and a receiving subscriber of said virtual link. It is also possible to mix in the same communication network subscribers that include an integrated switch as described previously and conventional switches (in the form of specific equipment). This is notably useful when the number of conventional subscribers (that do not include integrated switches) that must be connected to the network is too high with respect to the number of subscribers that include an integrated switch to be able to implement the necessary communication links.

The bandwidths of the various links 14 of the communication network are not necessarily identical. They can be optimized according to the traffic anticipated over these various links. Some links can have a bandwidth of 10 Mbit/s, others 100 Mbit/s or 1 Gbit/s, etc.

While at least one exemplary embodiment of the present invention has been shown and described, it should be understood that modifications, substitutions and alternatives may be apparent to one of ordinary skill in the art and can be made without departing from the scope of the invention described herein. This application is intended to cover any adaptations or variations of the specific embodiments discussed herein. In addition, in this application, the terms "comprise" or "comprising" do not exclude other elements or steps, the terms "a" or "one" do not exclude a plural number and the term "or" means either or both. Furthermore, characteristics or steps which have been described with reference to one of the above exemplary embodiments may also be used in combination with other characteristics or steps of other exemplary embodiments described above.

What is claimed is:

1. A communication network on board a vehicle, the communication network being a deterministic switched Ethernet network using virtual links and comprising:

a set of links;

a set of subscribers; and at least one switch containing a static configuration table that can be configured according to virtual links passing through this switch, said at least one switch being integrated in a subscriber from the set of subscribers and being connected to said subscriber so as to enable communications between said subscriber and at least one other subscriber of the communication network, wherein the switch integrated in said subscriber includes at least three external communication ports and the communication network is configured according to a mesh topology, such that the switch integrated in said subscriber is connected to at least three other entities by links from the set of links, these entities corresponding to subscribers and/or switches of the communication network.

2. The communication network as claimed in claim 1, wherein the subscribers from the set of subscribers and said at least one switch are configured to communicate over the communication network according to a communication protocol compatible with the standard ARINC 664 part 7.

3. The communication network as claimed in claim 1, comprising at least four switches each integrated in a subscriber from the set of subscribers, each of said at least four switches being connected to at least four other entities by links from the set of links and the topology of the communication network being of matrix type.

4. The communication network as claimed in claim 1, wherein each switch of the communication network is integrated in a subscriber from the set of subscribers.

5. The communication network as claimed in claim 1, wherein said at least one switch of the communication network integrated in said subscriber is implemented in software form in said subscriber.

6. The communication network as claimed in claim 5, wherein the network switch and at least one application of the subscriber are implemented in software form in the same electronic component of the subscriber.

7. The communication network as claimed in claim 1, further comprising redundant virtual links, these redundant virtual links following different paths in the communication network.

8. The communication network as claimed in claim 1, wherein a second switch is integrated in said subscriber and connected to said subscriber, the second switch being connected to a second communication network that is different from and redundant to said communication network.

9. A subscriber of a communication network on board a vehicle, the communication network being a deterministic switched Ethernet network using virtual links and including:
    a set of links;
    a set of subscribers;
    at least one switch containing a static configuration table that can be configured according to virtual links passing through the switch, said switch being integrated in a subscriber and connected to said subscriber so as to enable communications between said subscriber and at least one other subscriber of the communication network,
    wherein the switch integrated in said subscriber includes at least three external communication ports such that, the communication network being configured according to a mesh topology, and the switch can be connected to at least three other entities of the communication network by links from the set of links, these entities corresponding to subscribers and/or switches of the communication network.

10. The subscriber as claimed in claim 9, wherein the switch integrated in said subscriber is implemented in software form in said subscriber.

11. The subscriber as claimed in claim 10, wherein the switch and at least one application of the subscriber are implemented in software form in the same electronic component of the subscriber.

12. The subscriber as claimed in claim 9, wherein a second switch is integrated in said subscriber and connected to said subscriber, so as to provide a redundancy of the communication network when the second switch is connected to a second communication network that is different from and redundant to said communication network.

13. An aircraft comprising a communication network as claimed in claim 1.

14. A communication network having a mesh topology on board a vehicle, the communication network comprising:
    a plurality of communication links;
    a plurality of switches, each switch including at least three communication ports and containing a configuration table configured according to virtual links passing through respective switch; and
    a plurality of subscribers, each subscriber being connected to at least one of the plurality of switches,
    wherein
    each switch is configured to:
        connect to at least three other entities via links of the plurality of communication links, these three entities including at least one of the plurality of subscribers and/or at least one of the plurality of switches, and
        enable communications between one of its connected subscribers and another one of the plurality of subscribers, via at least one of the plurality of communication links, in accordance with the configuration table contained in respective switch.

15. The communication network according to claim 14, wherein at least one of the plurality of switches is configured to integrate with one of the plurality of subscribers.

16. The communication network according to claim 14, wherein the communication network is configured to enable one of the plurality of subscribers to communicate with any other subscribers of the communication network via at least one of the communication links.

17. The communication network according to claim 14, wherein at least one of the plurality of subscribers is configured to connect to a switch connected to another communication network that is redundant from the communication network.

18. The communication network according to claim 14, further comprising at least one communication link configured to enable redundant communications between two entities, these two entities including at least one of the plurality of subscribers and/or at least one of the plurality of switches.

19. The communication network according to claim 14, wherein at least one of the plurality switches is configured to regulate a flow of an outgoing traffic and/or a flow of an incoming traffic on its communication ports to optimize performance of the communication network.

20. A switch of a communication network on board a vehicle, the communication network having a mesh topology and comprising:
    a plurality of communication links; and
    a plurality of subscribers, each subscriber being connected to at least one switch of the communication network,
    the switch including three communication ports and containing a configuration table configured according to virtual links passing through the switch, and the switch being configured to:

connect to at least three other entities of the communication network via links of the plurality of communication links, these three other entities including at least one subscriber and/or at least one switch of the communication network, and enable communications between one of its connected subscribers and another one of the plurality of subscribers, via at least one of the plurality of communication links, in accordance with the configuration table contained in the switch.

\* \* \* \* \*